Patented Dec. 15, 1936

2,064,614

UNITED STATES PATENT OFFICE 2,064,614

ARTIFICIAL RESIN

Earle C. Kneale and Henry H. Wohlgemuth, Pontiac, Mich.

No Drawing. Application November 18, 1931
Serial No. 575,961

3 Claims. (Cl. 260—4)

This invention relates to artificial resins and to a process for producing the same, wherein new and useful compositions of matter may be produced having characteristics desirable in the industrial manufacture of varnishes, lacquers, molding compositions and for a variety of purposes.

One of the objects of the invention is to produce an improved resinous substance particularly useful in the manufacture of quick drying varnishes characterized by their increased elasticity, toughness, durability, and tensile strength, such varnishes being especially suitable for automobile protective coatings and the like.

The invention, according to one aspect thereof, contemplates producing a resinous complex by combining a phenol-aldehyde condensate, a neutral or natural acid resin, a polyhydric alcohol and a polybasic acid under conditions capable of producing a new composition from these substances. Where a natural resin is employed it is esterified with the polyhydric alcohol during a stage of the reaction.

We are aware that phenol-aldehyde resins have been combined with natural resins as well as with esterified acid resins, and that suggestions have been made to produce mixtures of resins such as phenol-formaldehyde and polyhydric alcohol-polybasic acid resins. Such compositions, however, do not possess the desired properties for the production, for example, of varnishes having the improved characteristics resulting from the use of resinous bodies made in accordance with our present invention.

The process of the invention may be conducted in several steps, such as follows: A phenol-formaldehyde condensation product, either an incomplete solid condensate or a liquid or semi-solid partial condensate is first formed and reacted with a neutral or natural acid resin. In the case of the latter, colophony is preferably employed, which may be esterified at any stage by employing a suitable quantity of glycerine for this purpose. The resinous body resulting from this process may be simultaneously heated with glycerine and phthalic anhydride, preferably in the presence of a fatty acid such as linoleic acid, and in conducting this reaction a drying oil or semi-drying oil, such as linseed or soya bean oil, is preferably added. The soya bean oil or linseed oil, or equivalent glyceride formed from glycerine and a fatty acid, may be introduced into the mass to increase the toughness and tensile strength of the final product. The condensate of phenol-formaldehyde, if in solid form, is preferably an intermediate condensate in which the condensation is not conducted to the final stage which would render the product insoluble and infusible. When combining such a substance, therefore, with a resin at high temperature the reaction should be conducted with care to avoid producing infusible masses, and to this end the condensation product and neutral or natural acid resin are preferably reacted in the presence of glycerine or other suitable alcohol.

The following example is illustrative of one way in which the invention may be carried out:

A neutralized condensate of a phenolic body, such as commercial cresol, and an aqueous solution of formaldehyde, such as a forty percent solution, is prepared by alkaline condensation. This condensate may then be reacted with melted colophony in the presence of glycerine. The acid number and melting point of the resulting gum will depend upon the relative proportions of glycerine, colophony and formaldehyde, upon the length of time the heating is conducted, and upon the temperature range. Thus, a gum having an acid number between 112 and 120 and a melting point between 65° C. and 70° C. may be satisfactorily produced with thirty seven and one-half parts by weight of condensate containing equal proportions of cresol and formaldehyde, sixty-two and one-half parts of glycerine, and five hundred parts of colophony.

Between sixty five and seventy parts of the foregoing resin may then be heated simultaneously with about one hundred and twenty five parts by weight of high gravity glycerine, about one hundred and ninety five parts of phthalic anhydride, and about one hundred and twenty five parts of a fatty acid, preferably linoleic or linseed oil fatty acid. The temperature may be carried to about 185° C., after which about fifty five parts of linseed oil or soya bean oil may be added and the temperature raised to about 200° C. and held until the resin clears. At this stage, if desired, thirty parts of linseed or soya bean oil may be added and the temperature raised to 280° C. When a test sample shows rubbery an additional quantity of linseed or soya bean oil, such as twenty five parts, may be introduced and the temperature maintained until the desired viscosity is obtained. The resin may then be drawn into containers to cool.

Although in the preferred example colophony is indicated as a natural acid resin adapted to produce successful results it is understood that any suitable natural resin may be employed such as the copal or fossil resins. Where it is desired to substitute a neutral resin, such as a coumarone-indene resin, for the natural acid resin, the total amount of glycerine will be reduced since it is not needed as an esterifying agent in connection with the neutral resin. In such instance the glycerine acts as an agent to prevent solidifying or substantial further condensation reaction of the phenol-formaldehyde liquid condensate due to the relatively high temperature it is reacted with the melted resin.

It will be understood that the proportions and relative amounts of the ingredients and the above temperatures may be varied without departing from the spirit of the invention, the foregoing examples being suggestive, but not exclusive, of ways in which the process may be carried out to produce satisfactory results.

In explaining in detail the present invention it is understood that the phraseology or terminology herein employed is for the purpose of description and not of limitation, that known equivalents of ingredients herein specified may be substituted, and that the invention is not expressly limited by the terms of the claims except as construed in view of the prior art.

We claim:

1. The process of producing a resinous body which comprises reacting the product of a phenol formaldehyde and alkaline partial condensation with a coumarone-indene resin in the presence of a polyhydric alcohol sufficient to prevent solidifying of the condensate.

2. The process of producing a resinous body which comprises directly reacting an alkaline phenol formaldehyde partial condensate with a coumarone-indene resin at reacting temperatures and in the presence of a polyhydric alcohol, in quantity sufficient to prevent substantial further condensation reaction of said condensate.

3. The method of producing a resinous body in which a liquid partial condensate of phenol-formaldehyde is directly reacted with a melted coumarone-indene resin at a temperature normally effective to complete the condensation of said condensate, in the presence of a sufficient quantity of polyhydric alcohol to prevent substantial further condensation of the condensate.

EARLE C. KNEALE.
HENRY H. WOHLGEMUTH.